United States Patent
Rosenberger et al.

(10) Patent No.: US 6,955,736 B2
(45) Date of Patent: Oct. 18, 2005

(54) PROCESS FOR MANUFACTURING A MULTI-LAYER FILM-TYPE LAMINATE FOR PACKAGING MATERIALS

(75) Inventors: Karolina Rosenberger, Osterfingen (CH); Fabian Bonsch, Neuhausen (CH); Hans-Rudolf Nageli, Neuhausen (CH); Juerg Frey, St. Gallen (CH)

(73) Assignee: Alcan Technology & Management Ltd., Neuhausen am Rhienfall (CH)

( * ) Notice: Subject to any disclaimer, the term of this patent is extended or adjusted under 35 U.S.C. 154(b) by 64 days.

(21) Appl. No.: 10/674,001

(22) Filed: Sep. 30, 2003

(65) Prior Publication Data

US 2004/0065408 A1 Apr. 8, 2004

(30) Foreign Application Priority Data

Oct. 7, 2002 (EP) .............................. 02405866

(51) Int. Cl.$^7$ .......................... B32B 31/00; B05D 1/12; B05D 3/02
(52) U.S. Cl. .................. 156/237; 156/230; 156/239; 156/240; 156/244.16; 156/273.3; 427/458
(58) Field of Search ................................. 156/230, 237, 156/240, 244.11, 244.16, 244.24, 239, 272.2, 289, 277, 272.6, 273.3, 273.5, 275.5; 427/457–8, 466, 470, 474, 482, 485, 487, 493, 496; 399/147, 177, 297, 298, 310, 311, 312, 320; 430/120, 124, 126, 199; 101/33, 34, 489

(56) References Cited

U.S. PATENT DOCUMENTS

| | | | | | |
|---|---|---|---|---|---|
| 4,480,003 | A | * | 10/1984 | Edwards et al. | 428/329 |
| 5,260,753 | A | * | 11/1993 | Haneda et al. | 399/54 |
| 5,275,918 | A | * | 1/1994 | Held et al. | 430/291 |
| 5,601,959 | A | * | 2/1997 | Brault et al. | 430/126 |
| 5,751,432 | A | * | 5/1998 | Gwaltney | 358/296 |

FOREIGN PATENT DOCUMENTS

| | | | | | |
|---|---|---|---|---|---|
| JP | | 50023826 A | * | 3/1975 | G03G/13/01 |
| JP | | 10123853 A | * | 5/1998 | G03G/9/08 |
| WO | WO 200050481 A1 | | * | 8/2000 | B29C/45/00 |

* cited by examiner

Primary Examiner—Sue A. Purvis
(74) Attorney, Agent, or Firm—Fisher Christen & Sabol

(57) ABSTRACT

The invention relates to a process for manufacturing a flexible film-type laminate (7) from two or more films (9a,9b) for packaging materials, whereby at least two films (9a,9b) are laminated to each other to give a film-type laminate and the film or film-type laminate is printed on, and at least one free surface of the film-type laminate is provided with a sealing lacquer coating (14). The invention is characterized in that the lamination (12), the printing (12) and the coating (14) of the film or film-type laminate with a sealant lacquer take place in-line at individual coating stations (1, 2, 4) in a production device (10) using an electrostatic coating process in which coating particles are electrostatically charged and deposited on the film surface to be coated using transfer means by applying an electric field, and melted and/or cured to give a coating film.

14 Claims, 2 Drawing Sheets

Figure 1:
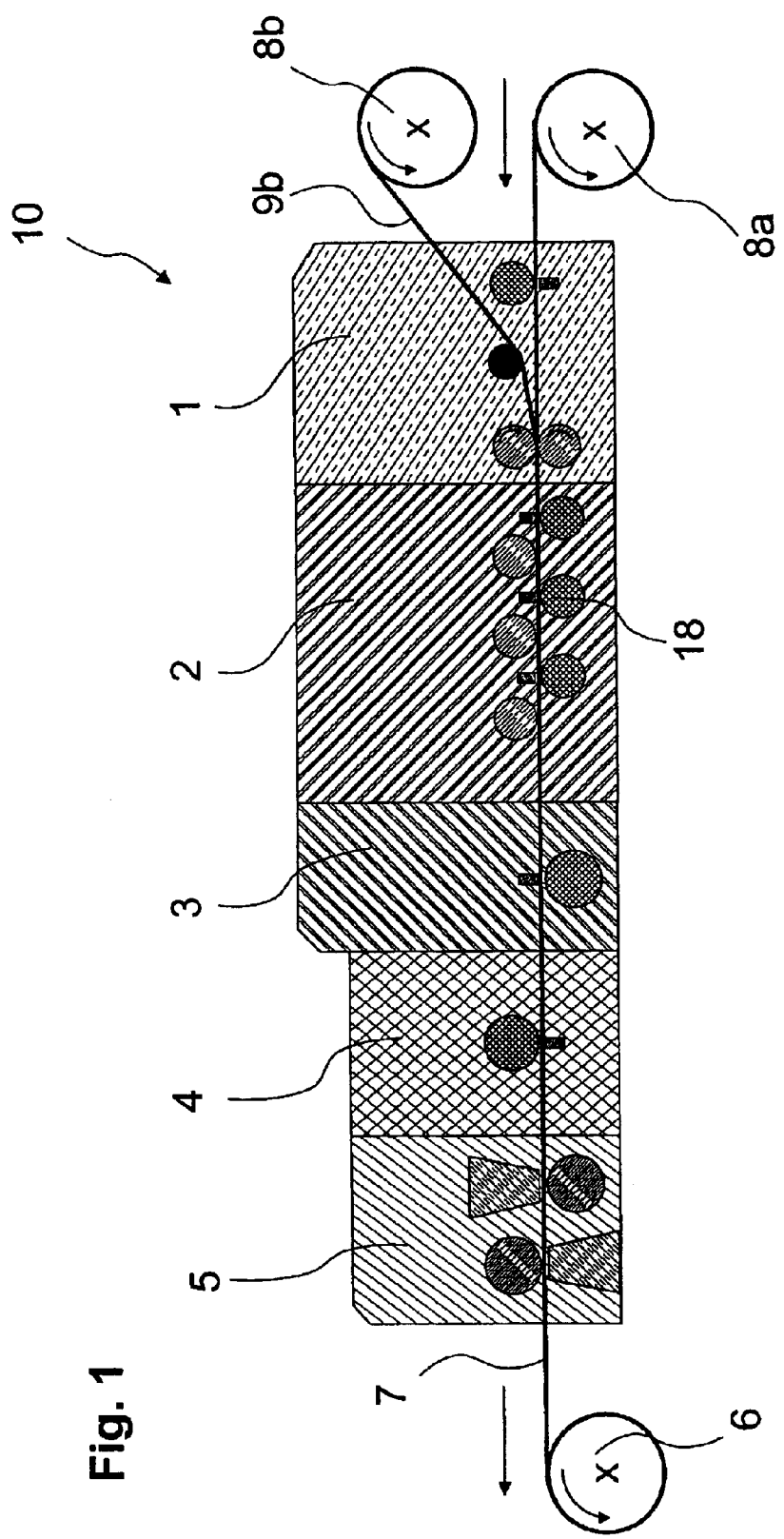

PROCESS FOR MANUFACTURING A MULTI-LAYER FILM-TYPE LAMINATE FOR PACKAGING MATERIALS

This application has priority benefit of European Patent Application Number 02405866.1, filed Oct. 7, 2002.

The present invention relates to a process for manufacturing a packaging material from a flexible multi-layer film-type laminate, comprising the following process steps: manufacturing the film-type laminate from a plurality of films or layers by means of a laminating and/or extrusion process, printing on the film or film-type laminate and coating at least one of the free surfaces of the film-type laminate with a sealing lacquer. The invention also relates to a device for manufacturing the film-type laminate and the use of the film-type laminate.

The production of film-type laminates with printing and sealing layers is normally carried out today using a plurality of process steps and devices which are separate from each other.

The films are e.g. brought together in a laminating facility and combined to give a film-type laminate. As a rule, the adhesive is deposited on the films by means of rolls and the films, subsequently, are combined to give a film-type laminate. In a subsequent process step, the film-type laminate is printed on. The printing of the laminate is carried out e.g. by means of intaglio or offset printing. If the laminate contains a counter-print image, then the films are provided with a counter-print image in a printing unit before the laminating step.

The printed film-type laminate is subsequently provided with lacquer coatings in a coating unit; these may e.g. be overprinting lacquers or sealing layers. The coating of lacquer is normally deposited by roll coating, immersion coating or spray coating.

For coating purposes, the films are fed individually from coils of film material and, on completion of this step, again re-wound and taken away for further processing. In some cases, in order to carry out the above mentioned process steps, the films have to be unwound and rewound from the coils and taken away and stored for interim periods for subsequent process steps.

The production of a printed and lacquer-coated film-type laminate in individual process steps using various coating or deposition methods is very complicated and time consuming.

The object of the present invention is therefore to propose a manufacturing process and device by means of which the above mentioned disadvantages can be avoided.

That objective is achieved by way of the invention in that the lamination process and/or extrusion process, the printing and coating with a sealant lacquer take place in-line at individual stations in a common production facility, and the printing and the coating with a sealing lacquer take place at coating stations using an electrostatic coating process in which coating particles are electrostatically charged and deposited on the film surface to be coated using transfer means by applying an electric field, and melting and/or hardening the same to give a coating film.

The film-type laminate is preferably made from two or more films, whereby at least two films are laminated together and the lamination takes place at a lamination station in the production facility using an electrostatic coating process in which coating particles are electrostatically charged and are deposited on the film surface to be coated using transfer means by applying an electric field and melting and/or hardening the same to give a coating film in the form of an adhesive layer.

The coating of sealing lacquer is a cold-sealing lacquer or, especially preferred, a hot-sealing lacquer.

The hardening or curing of the coating is important in the case of chemically cross-linking coating systems. In the case of coating materials in the form of thermoplastic materials (e.g. melting adhesives, hot-melts) conventional curing is not necessary. When employing curing-type coating systems, the curing of the adhesive layer/layers, the singular or multiple printing, the deposition of the print-covering layer of lacquer and/or the sealing layer of lacquer may take place in curing units in the respective coating stations.

In a preferred version the curing of the above mentioned coatings takes place in-line in a common curing station of the production facility downstream of the coating stations.

The coating particles or the coatings may be coating systems hardened e.g. by radiation, in particular UV-radiation (ultraviolet radiation) or EB-radiation (electron-beam radiation). The use of UV or EB curing coatings in electrostatic coating processes makes it possible to employ solvent-free coating systems.

In the case of the radiation-curing coating systems according to the invention the sometimes necessary melting and formation of the coating particles on the substrate is uncoupled from the actual curing process, this in contrast to thermally curing coating systems.

The radiation-curing coating systems, such as UV-curing or EB-curing coating systems contain so-called initiators e.g. photo-initiators in UV-curing coating particles, which are activated under the influence of energy applied e.g. using UV or EB radiation and effect immediate polymerization of the coating.

In a preferred version of the invention, after deposition on the substrate (plastic film), the coating particles are heated e.g. to 70–80° C. and melted in a so-called heating unit e.g. by means of IR (infra-red) radiation or NIR (near infra-red) radiation, in particular by means of heated rolls. A fine, uniform film which adheres to the substrate is formed as a result of the melting. In each case the heating unit for this purpose is situated at the individual coating station.

After depositing the coating particles and if desired after heating and melting the coating into the form of a fine film, there follows the fixing of the melt product on the substrate by means of a radiation-curing system in a subsequent curing station. The cross-linking reactions effected by the curing process are, as already mentioned, initiated preferably by means of ultraviolet or electron beam radiation.

The coating particles or the coatings, in particular hot-sealing lacquer coatings, printing or adhesive coatings, may however be based on thermoplastics, whereby curing as such no longer takes place. After transfer from the transfer medium to the substrate, the coating particles are rather—as described above—melted to give a coating film and solidified on cooling.

The production device contains preferred means for electronic data processing which control specific, partial-area i.e. localized deposition in the form of printing, the deposition of a layer of lacquer over the printing or a layer of sealing lacquer. The localized deposition results in the creation of a printed image.

The production device may also contain means for electronic data processing which enable the thickness of the layer to be deposited at the individual coating stations to be supervised and/or controlled. The said means are preferably employed at the following stations, if present, viz., the lamination station, the print overlayer station and/or the sealing lacquer station. The control of the thickness of layer to be deposited or the localized deposition is achieved preferably using digital printing techniques.

The coating particles for the laminate or adhesive layer may be liquid or dry particles. They are preferably in dry form e.g. as a powder. The coating particles may be e.g. part of a two-component development system with a carrier. The coating particles may also be part of a single component development system. The coating preferably covers the whole surface area.

The coating particles at the printing station are preferably dry or liquid toner particles. The toner may e.g. be a two-component dry-toner or a two-component development system with a carrier. The toner may also be a single-component toner.

The printed image is comprised usefully of pictures and/or drawn patterns which e.g. contain sequences, reproductions, patterns, lines, random patterns. The pictures and/or drawn patterns may e.g. be colored, black, white or in gray tones.

The pictures and/or drawn patterns are usefully based on a printer's copy. The data for the printer's copy are preferably available in digital form and are e.g. created or re-worked by means of desktop-publishing i.e. employing programmes for processing images and texts or the like using equipment for electronic data processing (EDP).

The data may be e.g. stored on a magnetic, magneto-optical or optical storage medium. It is also possible to take printer's copies in the form of analogue data—using appropriate means such as EDP-units and data-processing programs (e.g. scanners)—to capture and to transform and process this further into digital signals by means of an analogue-digital transformer. The data of the printer's copy in digital form are usefully reproduced on the packaging materials by way of an electro-photographic process.

Colored images and/or drawn patterns are usefully created in a series of printing steps one after the other in different printing units in the printing station, whereby e.g. an appropriate toner with a specific color pigment is employed at each step.

Further, two or more printer's copies may be applied e.g. using EDP via text and/or image processing programs to yield a complete image and/or drawn pattern. Apart from a printer's copy, it is possible to copy in another continuous printer's copy which changes for each area to be printed or changes in another sequence, whereby by "copy in" or "copy" it is to be understood the reproduction of an image to be reproduced usefully present in electronic data form. This makes it possible to prepare e.g. serial numbers, patterns or color-differing packaging materials for individual packs and the like in one process step. A printer's copy may be reproduced singly or a number of times.

Using digitalization and appropriate data processing programs the images to be printed may be worked over and changed in an almost unlimited manner.

The packaging material supplied in roll form to foil processing equipment may also contain a pre-printed image or base image using one of the above mentioned classical printing methods.

The coating particles for creating a print overlayer and/or lacquer sealing layer may be in the form of liquid or solid particles. These are preferably in solid form e.g. in powder form or as powder lacquer. Print overlayers, and in particular hot-sealing lacquers, are preferably in the form of powder lacquers, whereby the hot-sealing lacquer is in particular preferably a thermoplastic which is capable of melting. Cold-sealing lacquer is preferably deposited in the form of liquid particles.

The coating particles may e.g. be part of a two-component developer system with a carrier. The coating particles may also be part of a single component developer system. The coating particles are preferably pigment-free or pigmented in such a manner that the layer produced using them is at least translucent and the underlying print remains visible.

The film-type laminate may exhibit only a sealing coating or both a print overlayer coating, also called protective lacquer coating, and a sealing lacquer coating. The film-type laminate may exhibit, e.g. on the side to be sealed, a sealing coating and printing on the opposite, free side, and on top of this a print overlayer coating. On the same free side, the film-type laminate may exhibit in combination, both a localized sealing coating in the region of the sealing areas and a localized print overlayer coating in the region of the printed images. Further, the sealing layer may also be provided on the free side of the print overlayer coating.

The sealing layer is preferably deposited specifically on the part of the surface in the region of the sealing area. The print overlayer coating is preferably deposited specifically on the part of the surface in the region of the printed image. The print overlayer is usefully translucent or partly or completely transparent. The thickness of the sealing coating or the print overlayer coating may be 7–100 $\mu$m, in particular 10–50 $\mu$m.

The print overlayer and/or sealing coating are usefully deposited by use of electronic data processing means, such as image-processing means, forming an image pattern on part of the film surface.

The image is usefully based on a printer's copy, the data for which are preferably in digital form. The preparation, processing and storage of the image may take place in a manner similar to that of the image and drawn pattern of printer's copies for printing purposes. The related above disclosure applies also to images for areas on print overlayer and sealing type coatings. The images for that purpose are likewise created preferably by means of an electro-photographic method.

Print overlayer coatings deposited on the basis of a radiation-curing coating system, such as e.g. ultraviolet or electron beam radiation, exhibit excellent adhesion to the substrate and the print. The print overlayer can be re-melted preferably at temperatures of 200° C. and more and remains stable when the packaging material is heated during hot sealing or sterilization, so that the underlying print is protected against damage.

In carrying out the process at least two films or film-type laminates are unwound from a coil and passed on to the laminating station in the production device. In the laminating station one or both of the free surfaces of the films or film-type laminates to be bonded is/are coated with an adhesive using an electrostatic coating process. In a heating unit immediately downstream of the coating unit, the adhesive is then preferably melted to give an adhesive and, if desired, cured. Following this, the films are brought together and bonded to give a laminate, whereby the layer of adhesive solidifies on cooling.

It is conceivable for the laminate produced in this manner to be laminated with one or more additional films or film-type laminates in one or more laminating stations. Instead of lamination, it is also conceivable at an extrusion station for an additional layer to be extruded onto a film or film-type laminate previously unwound from a coil.

In a printing station following the lamination or extrusion station the film-type laminate is printed in one or more colors on one or both sides. The printing station may be subdivided into substations, i.e., in individual printing units in which individual colors are deposited in line one after the other and combined to give a colored image.

If the film-type laminate is to feature a counter image, then the films or film-type laminates are provided with a counter-print image in a printing station situated upstream of the laminating or extrusion station.

The printed film-type laminate is subsequently coated in the sealing coating station with a sealing layer on one side on part or the whole surface area. The side that has been printed on, which is preferably the side opposite the free side, may also be coated with a print overlayer coating on part or the whole surface area. The sealing station may also be situated upstream of the printing station.

The coating unit in the print overlayer and/or sealing station is preferably situated downstream of a heating unit in which, under the influence of heat, the coating—in particular the powder lacquer coating—is melted to give a uniform lacquer film that bonds to the film surface and is subsequently solidified or cured.

The film-type laminate according to the invention may be manufactured in the form of monofilms or multi-layer films or film-type laminates. The films may be e.g. of metal (metal foils, thin metal layers), paper, plastic or a combination thereof. The film-type laminate may contain layers of paper, metal or plastic. Examples of metal foils as packaging material are foils of iron, steel, copper and, preferably, aluminum and its alloys.

Suitable plastics are e.g. polyvinylchloride (PVC), polyvinylidenchloride (PVDC), polyesters, polycarbonates, polyvinylacetates, polyolefins and in particular polyethylene (PE), and also polypropylenes (PP) and polyamides (PA). Further plastics not listed here are also conceivable.

The thickness of the packaging material may e.g. range from 5 $\mu$m to 1000 $\mu$m. Useful are thicknesses of 15 to 200 $\mu$m. The film or film-type laminate may also contain barrier layers e.g. thin ceramic layers.

The invention also relates to a production device for manufacturing a multi-layer film-type laminate. The production device according to the invention contains a foil processing equipment with an uncoiling and coiling system for uncoiling and coiling the films present in roll form.

The production device according to the invention is characterized in that it contains at least one laminating and/or extrusion station for manufacturing a multi-layer film-type laminate, at least one printing station and at least one sealing coating station, and the individual stations are arranged in line as integral modules of the production device, whereby the printing station and the sealing coating station contain means for coating the films or film-type laminate using an electrostatic coating process.

The means for electrostatic coating contain usefully means for electrostatic charging of the coating particles and means for transferring the electrostatically charged coating particles to the film surface (substrate) to be coated.

The means for transferring the electrostatically charged coating particles comprise preferably a rotatable transfer roll or transfer belt on which the electrostatically charged coating particles are deposited by electrostatic forces and means for applying an electric field to transfer the electrostatically charged coating particles from the transfer roll or transfer belt to the film surface to be coated.

The transfer of the coating particles to the film surface is carried out preferably by means of a process employing so called EMB-Technology (Electro-Magnetic Brush Technology) such as is employed in particular in two-component developer systems. Here, a so-called carrier is employed in the form of ferromagnetic particles, whereby the coating particles are attached to the carrier by tribo-electrical forces. The developer system comprising the carrier and the coating particles adhering to them is deposited over a rotating magnet roll facing the transfer roll or transfer belt. As a result of the magnetic forces acting between the magnet roll and the carrier, the developer system is drawn in a chain-like manner to the magnet roll and forms a brush-like arrangement, also known as magnet brush. The magnet brush strokes the transfer roll and creates a so-called brush effect as a result of which the coating particles are transferred, with the aid of electrostatic forces, to the electrostatically charged surface of the transfer roll.

In the transfer process itself the coating particles are transferred e.g. by means of corona discharge, directly or indirectly from the transfer roll to the substrate to be printed on. The coating particles are then fixed to the substrate if desired in the molten state. Depending on the coating system employed the coating is hardened in a separate curing station or curing unit.

In the coating stations and in particular in that coatings station in which the film surface is coated in specific areas, an electrophotographic coating process is employed by way of preference. In this case the transfer roll is usefully a photo-carrier, preferably in the form of a drum, roll or transfer belt. The photo-carrier is coated on the surface with a photo-conductor. At a corona discharging station the photo-conducting surface layer of the photo-carrier is charged uniformly in darkness. The photo-conducting layer is exposed to a light source which reproduces the image in light form, whereby the illuminated part of the photo-conducting layer is discharged. A charge-image corresponding to the print image is produced.

In the developing stage the electrostatically charged coating particles are transferred to the charge-image, whereby the coating particles—which are charged with a charge opposite that of the photo-conducting layer—are drawn onto the charge-image on the photo-carrier under the action of the electrostatic forces, thus reproducing the print image. The coating particles are then transferred via electrostatic attraction from the photo-carrier directly or indirectly onto the substrate.

Processes which by definition fall into the category of electrophotographic processes include direct and indirect electrophotographic processes such as e.g. xerography, whereby an indirect electrophotographic process, in particular a xerographic process, is employed by way of preference.

The coating stations preferably contain means for electronic data processing for the purpose of monitoring and/or controlling deposition of a layer over part of the surface area and for monitoring and/or controlling layer thickness. In particular the printing station usefully contains means for image processing and means for specific deposition of the coating particles on parts of the surface area.

The image processing means preferably comprise means for electronic data processing (EDP), such as, image and/or text processing programs for creating an image or drawn pattern in the form of a printer's copy. The printer's copy is preferably in digital form.

Further processing units may, according to specific needs, be added to the production device. The production device may e.g. include further downstream a cutting station or a device for automatic packaging.

The film-type laminate manufactured according to the invention is preferably employed for the production of sealable forms of packaging, in particular pouch-type packaging, such as, flat pouches, flat-bottom bags pouches, standing pouches, large and small bags, cushion-type packs, and sacks. Further, the film-type laminate may also be employed to manufacture supports for goods, boxes, base parts for push-through packs, blister packs, or lid materials for containers or supports for goods.

Figure 2:
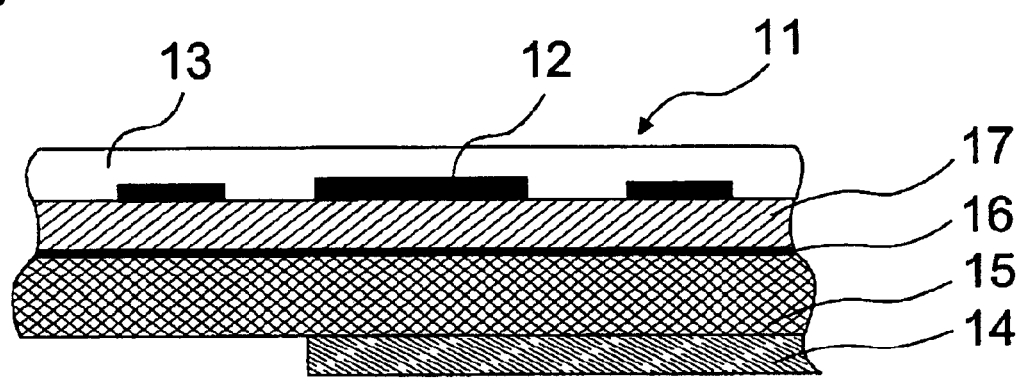

The invention is described in the following by way of examples and with reference to the accompanying drawing which shows in:

FIG. 1: a schematic representation of a production device for manufacturing a packaging material;

FIG. 2: a cross-section through a packaging material manufactured according to the invention.

The production device 10 contains an uncoiling device, a laminating station 1, a printing station 2, a print overlay coating station 3, a sealing coating station 4, a curing station 5 and downstream of this a coiling station (se FIG. 1). The uncoiling device contains two rolls 8a, 8b from which a first and a second roll of strip-shaped film or film-type laminate 9a, 9b are unwound and fed continuously into the laminating station 1. In the laminating station 1 the first film 9a is coated with an adhesive using an electrostatic, preferably electrophotographic process, whereby after the adhesive has been deposited on the film, it is melted to give an adhesive film and the two films 9a, 9b are laminated together.

The film-type laminate is then passed through a printing station 2 in which one of the free surfaces of the film-type laminate is printed on using an electrophotographic process. It is possible to print on both sides of the film-type laminate. The printing may take place in one or several steps using one or more toners with different pigments. Depending on the number of printing steps the printing station may contain one or more printing units 18.

The layers of toner deposited on the film are melted on in a subsequent heating station (not shown here) forming a film that adheres to the substrate film surface, and, then, are solidified.

After the printing, the film-type laminate is passed through the print overlayer station 3 which follows on from printing station 2. Here a print overlayer lacquer coating is deposited either over the whole or only part of the printed surface of the film-type laminate.

Following the print overlayer station 3 is the sealing layer station 4 in which the free side, opposite that which has been printed on, is coated either wholly or in part with a sealing-type lacquer coating, in particular a hot-sealing lacquer coating.

The deposition of the lacquer coatings at both coating stations 3, 4 is carried out using an electrostatic, preferably electrophotographic process. Each coating station 3, 4 also has a heating unit (not shown here) associated with it in which the lacquer coating is melted to form a lacquer film that adheres to the substrate film surface and subsequently is solidified.

The layer of adhesive, the print and the print overlayer are coatings that can be cured by UV or EB radiation and are cured in a common curing station 5 by means of UV or EB radiation after the coating steps.

The finished film-type laminate 7 is then wound onto a film coiling roll 6 for further processing.

In a modified version of the example each coating station can feature a curing unit instead of having a common curing station 5, so that each layer deposited can be cured individually by UV or EB radiation.

A film-type laminate 11 in FIG. 2 manufactured using the process according to the invention contains a first film 15 and a second film 17 which are laminated together using an adhesive layer 16. The first free surface of the film-type laminate 11 exhibits printing 12. A print overlayer coating 13 is present on top of the printing 12.

Deposited on the free surface of the film-type laminate 11 opposite that bearing the printing 12 is a layer of sealing lacquer. The coating of sealing lacquer 14 may cover the actual sealing area in part or cover the whole of the film-type laminate 11.

What is claimed is:

1. Process for manufacturing a packaging material from a flexible, multi-layer film-type laminate, containing the following steps: production of the film-type laminate from a plurality of films or layers using a laminating and/or extrusion process, printing on the film or the film-type laminate and coating at least one free surface of the film-type laminate with a sealing lacquer, characterized in that, the laminating process and/or extrusion process, the printing (12) and the coating with sealing lacquer (14) take place in-line at individual stations in a common production device (10), whereby the printing (12) and the coating with sealing lacquer (14) take place at coating stations (2, 4) using an electrostatic coating process in which coating particles are charged electrostatically and transferred to the film surface to be coated using transfer means by applying an electric field and melted to give a coating film and/or cured.

2. Process according to claim 1, characterized in that the flexible film-type laminate is made up from two or more films, whereby at least two films are laminated onto each other to give a film-type laminate and the lamination takes place at a laminating station (1) in the production device (10) using an electrostatic coating process in which coating particles are electrostatically charged and transferred to the film surface to be coated using transfer means by applying an electric field then melted to give a coating film and/or cured.

3. Process according to claim 2, characterized in that the free surface of the multi-layer film-type laminate is printed on and the production device contains a print overlayer coating station and a transparent or translucent print overlayer coating is deposited on the printing lying on the free surface of the film-type laminate, whereby the print overlay lacquer coating is deposited using an electrostatic coating process in which coating particles are charged electrostatically and transferred to the film surface to be coated using transfer means by applying an electric field and then melted to give a coating film and/or cured.

4. Process according to claim 3, characterized in that the laminate coating, the printing, the print overlayer and/or the sealing layer are cured in the related coating stations.

5. Process according to claim 3, characterized in that the curing of the laminate coating, the printing, the print overlayer and/or the sealing layer takes place in-line in a common curing station (5) situated in the production device (10) after the coating stations (1, 2, 3, 4).

6. Process according to claim 5, characterized in that the laminate coating, the printing, the print overlayer and/or the sealing layer are coating systems that are cured/hardened by radiation, preferably by UV or EB radiation.

7. Process according to claim 6, characterized in that the coatings at the laminating station (1), the printing station (2), the print overlayer station (3) and/or the sealing station (4) are formed via an EMB process using a two-component developer system.

8. Process according to claim 7, characterized in that the coatings at the laminating station (1), the printing station (2), the print overlayer station (3) and/or the sealing station (4) are formed via an electrophotographic process.

9. Process according to claim 8, characterized in that the coating particles at the printing station (2) are dry or liquid toner particles and the toner particles are deposited using electronic data processing means such as image processing means and forming a printed image over part of the film surface.

10. Process according to claim 9, characterized in that the coating particles of the print overlayer (13) and/or the sealing layer (14) are in the form of a powdered lacquer.

11. Process according to claim 10, characterized in that the sealing coating (14) is a cold-sealing or hot-sealing lacquer.

12. Process according to claim 11, characterized in that the sealing layer (14) is deposited locally, using electronic data processing means, on the areas of packaging material surface that is to be sealed.

13. Process according to claim 12, characterized in that the print overlayer (13) is deposited locally, using electronic data processing means, on the areas of packaging material that are printed on.

14. Process according to claim 13, characterized in that the thickness of the laminating layer, the print overlayer and/or the sealing layer is controlled by electronic data processing means.

* * * * *